United States Patent
Hahn et al.

(10) Patent No.: US 10,007,442 B2
(45) Date of Patent: Jun. 26, 2018

(54) METHODS, SYSTEMS, AND COMPUTER READABLE MEDIA FOR AUTOMATICALLY DERIVING HINTS FROM ACCESSES TO A STORAGE DEVICE AND FROM FILE SYSTEM METADATA AND FOR OPTIMIZING UTILIZATION OF THE STORAGE DEVICE BASED ON THE HINTS

(71) Applicant: SanDisk Technologies LLC, Plano, TX (US)

(72) Inventors: Judah Gamliel Hahn, Ofra (IL); Joseph Robert Meza, Aliso Viejo, CA (US); Daniel Edward Tuers, Kapaa, HI (US)

(73) Assignee: SanDisk Technologies LLC, Plano, TX (US)

( * ) Notice: Subject to any disclaimer, the term of this patent is extended or adjusted under 35 U.S.C. 154(b) by 0 days. days.

(21) Appl. No.: 14/464,584

(22) Filed: Aug. 20, 2014

(65) Prior Publication Data
US 2016/0054934 A1 Feb. 25, 2016

(51) Int. Cl.
*G06F 12/00* (2006.01)
*G06F 3/06* (2006.01)
*G06F 12/02* (2006.01)

(52) U.S. Cl.
CPC .......... *G06F 3/0613* (2013.01); *G06F 3/0659* (2013.01); *G06F 3/0679* (2013.01); *G06F 12/00* (2013.01); *G06F 12/0246* (2013.01)

(58) Field of Classification Search
USPC ................................................ 711/103, 115
See application file for complete search history.

(56) References Cited

U.S. PATENT DOCUMENTS 6,092,154 A 7/2000 Curtis et al.
7,743,038 B1 6/2010 Goldick
7,937,393 B2 5/2011 Prahlad et al.
8,275,946 B1 9/2012 Smith
8,775,741 B1* 7/2014 de la Iglesia ....... G06F 12/0862
  711/137
2003/0188184 A1* 10/2003 Strongin ............... G06F 12/145
  726/30

(Continued)

OTHER PUBLICATIONS

"Ext4 Disk Layout," https://ext4.wiki.kernel.org/index.php/Ext4_Disk_Layout, Wikipedia, pp. 1-28 (Nov. 17, 2014).
"CreateFile function," Microsoft, Windows Dev Center, https://msdn.microsoft.com/en-us/library/windows/desktop/aa363858(v=vs.85).aspx, pp. 1-20 (2008).
"NVM Express," Specification Revision 1.2, http://nvmexpress.org/wp-content/uploads/NVM_Express_1_2_Gold_20141209.pdf, pp. 1-205 (Nov. 3, 2014).
"I/O Limits: block sizes, alignment and I/O hints," Red Hat, http://people.redhat.com/msnitzer/docs/io-limits.txt, pp. 1-4 (Jan. 14, 2013).
Commonly-assigned, co-pending U.S. Appl. No. 14/555,548 for "Storage Devices and Methods for Optimizing Use of Storage Devices Based on Storage Device Parsing of File System Metadata in Host Write Operations," (Unpublished, filed Nov. 26, 2014).

(Continued)

Primary Examiner — Yaima Rigol
Assistant Examiner — Tasnima Matin
(74) Attorney, Agent, or Firm — Loza & Loza, LLP; Gabriel Fitch

(57) ABSTRACT

Methods, systems, and computer readable media for automatically deriving hints from storage device accesses and from file system metadata and for utilizing the hints to optimize utilization of the memory storage device are provided. One method includes analyzing an input/output operation involving non-volatile memory or file system metadata. The method further includes automatically deriving, based on results from the analyzing, a hint regarding an expected access pattern to the non-volatile memory. The method further includes using the hint to optimize utilization of the non-volatile memory.

29 Claims, 6 Drawing Sheets

(56) References Cited

U.S. PATENT DOCUMENTS

| | | |
|---|---|---|
| 2006/0106984 A1* | 5/2006 | Bartley .................. G06F 12/08 711/118 |
| 2006/0179236 A1 | 8/2006 | Shafi |
| 2008/0320211 A1 | 12/2008 | Kinoshita |
| 2009/0031083 A1 | 1/2009 | Willis et al. |
| 2009/0228875 A1* | 9/2009 | DeVries .............. G06F 11/3476 717/154 |
| 2010/0262721 A1* | 10/2010 | Asnaashari ........... G06F 13/161 710/5 |
| 2011/0296088 A1 | 12/2011 | Duzly et al. |
| 2011/0320685 A1 | 12/2011 | Gorobets et al. |
| 2012/0051137 A1 | 3/2012 | Hung et al. |
| 2012/0144092 A1 | 6/2012 | Hsieh et al. |
| 2012/0284587 A1 | 11/2012 | Yu et al. |
| 2012/0317335 A1 | 12/2012 | Cho |
| 2013/0024609 A1* | 1/2013 | Gorobets ............ G06F 12/0246 711/103 |
| 2013/0080732 A1* | 3/2013 | Nellans ............... G06F 12/0246 711/206 |
| 2013/0086311 A1 | 4/2013 | Huang et al. |
| 2013/0138867 A1 | 5/2013 | Craft et al. |
| 2013/0191349 A1 | 7/2013 | Akirav et al. |
| 2013/0262533 A1* | 10/2013 | Mitra ................ G06F 17/30132 707/822 |
| 2013/0262736 A1 | 10/2013 | Kegel et al. |
| 2013/0275672 A1 | 10/2013 | Bert |
| 2013/0297852 A1* | 11/2013 | Fai .......................... G11C 16/12 711/103 |
| 2014/0082324 A1 | 3/2014 | Elhamias et al. |
| 2014/0149641 A1* | 5/2014 | Avila .................... G11C 11/412 711/103 |
| 2014/0289492 A1* | 9/2014 | Ranjith Reddy ..... G06F 3/0613 711/170 |
| 2014/0337560 A1 | 11/2014 | Chun et al. |
| 2015/0199269 A1* | 7/2015 | Bert .................... G06F 12/0246 711/103 |
| 2015/0356020 A1 | 12/2015 | Desai et al. |
| 2016/0026406 A1 | 1/2016 | Hahn et al. |
| 2016/0054931 A1 | 2/2016 | Romanovsky et al. |
| 2016/0054934 A1 | 2/2016 | Hahn et al. |
| 2016/0246726 A1 | 8/2016 | Hahn |

OTHER PUBLICATIONS

Commonly-assigned, co-pending U.S. Appl. No. 14/977,559 for "Methods, Systems, and Computer Readable Media for Automatically and Selectively Enabling Burst Mode Operation in a Storage Device." (Unpublished, filed Dec. 21, 2015).

Non-Final Office Action for U.S. Appl. No. 14/297,563 (dated Dec. 4, 2015).

"NVM Express Overview," NVM Express, pp. 1-2 (copyright 2013).

"Understanding the Flash Translation Layer (FTL) Specification," AP-684 Application Note, Intel, pp. 1-20 (Dec. 1998).

Notice of Allowance and Fees Due for U.S. Appl. No. 14/297,563 (dated Jul. 25, 2016).

Non-Final Office Action for U.S. Appl. No. 14/555,548 (dated Jul. 5, 2016).

"NVM Express," Specification Revision 1.2.1, http://www.nvmexpress.org/wp-content/uploads/NVM_Express_1_2_1_Gold_20160603.pdf, pp. 1-217 (Jun. 5, 2016).

Final Office Action for U.S. Appl. No. 14/297,563 (dated Apr. 13, 2016).

Non-Final Office Action for U.S. Appl. No. 14/814,460 (dated Mar. 28, 2016).

Prabhakaran et al., "Analysis and Evolution of Journaling File Systems," 2005 USENIX Annual Technical Conference, pp. 105-120 (2005).

Hahn, Judah G. et al., Non-Final Office Action dated May 10, 2017 for U.S. Appl. No. 15/050,364.

Romanovsky, et al., Final Office Action dated Jan. 25, 2017 for U.S. Appl. No. 14/555,548.

Hahn, et al., Office Action dated Dec. 14, 2017 for U.S. Appl. No. 15/050,364.

Romanovsky, et al., Office Action dated Aug. 9, 2017 for U.S. Appl. No. 14/555,548.

* cited by examiner

METHODS, SYSTEMS, AND COMPUTER READABLE MEDIA FOR AUTOMATICALLY DERIVING HINTS FROM ACCESSES TO A STORAGE DEVICE AND FROM FILE SYSTEM METADATA AND FOR OPTIMIZING UTILIZATION OF THE STORAGE DEVICE BASED ON THE HINTS

TECHNICAL FIELD

The subject matter described herein relates to memory storage device optimization. More particularly, the subject matter described herein relates to methods, systems, and computer readable media for automatically deriving hints from accesses to a storage device and from file system metadata and for optimizing utilization of the storage device based on the hints.

BACKGROUND

When accessing storage devices, it is desirable to optimize utilization of the devices. For example, flash memory devices have memory cells with a finite number of program and erase cycles before the cells experience errors and become unusable. Frequently accessed host data should generally not be stored in such memory cells. Rather, frequently accessed host data should be stored in dynamic memory cells, i.e., cells with a comparatively larger number of program and erase cycles.

In addition, it is desirable to store data with the same anticipated host access pattern together in a memory storage device because of differences in access granularity between a host and the memory device. For example, in a flash memory device, it may not be desirable to store a temporary file that is frequently accessed in the same memory block as an image file that is infrequently accessed because accesses to the memory block that stores the temporary file would also access the memory cells that store the image file. Because the storage device only sees I/O operations that specify ranges of memory addresses, the characteristics of the data being stored or how the data will be accessed by the host in the future is not explicitly communicated to the storage device. As a result, data may be stored in suboptimal locations of the memory device.

The protocol stack through which a host system, such as a host computer, accesses a storage device is referred to as the host storage stack, commonly referred to as the file system driver. The host storage stack includes a number of layers abstracting application logic from the logical blocks that represent the storage device. These include caching layers, memory-mapped buffers, and file systems which allow an application developer to store data in files rather than managing the actual block device interface.

Over the last 30 years, the storage stack has evolved from linear-access technologies (such as tape) to random access devices that have a seek penalty (such as floppy disks and hard disk drives (HDDs)) to random-access flash devices such as solid state drives (SSDs), which have no inherent seek penalty but which access physically sequential data more efficiently than random-access data. As part of the abstraction, it is difficult for a storage device to define (or devise) the ideal access pattern desired by the host. In the case of flash storage devices, the device can adjust its storage strategy if the storage device has information in advance of what the host's read pattern would be for certain logical block address (LBA) sequences. As an example, if the device has information that a certain LBA range, for example, will be read sequentially at boot, it may make that range available for access before it completes internal initialization. As another example, if the device has information that that a certain LBA sequence will only hold temporary files with a lifetime of one host power cycle, it may choose particular flash regions which are tuned for lower retention or keep data destined for these LBAs in RAM. As alluded to above, most of the knowledge regarding LBA sequences is maintained in the upper layers of the storage stack (such as the file system) and is not communicated down to the storage device.

Storage protocols such as Hybrid serial advanced technology attachment (SATA) and non-volatile memory express (NVMe) include the ability for the host to create "hints", which advise the device of characteristics of specific LBA ranges. These hints do not require the device to change its behavior, but optionally allow for optimization of specific ranges. Sending hints effectively requires the cooperation of multiple parts of the storage stack, since the metadata used to determine a hint is typically abstracted away within the file system.

Although current operating systems may send hints on an extremely limited basis, such hints are not effective for solid state drive optimization. This requires new solutions that bridge the host-device gap in hinting.

Accordingly, there exists a need for methods, systems, and computer readable media for automatically deriving hints from accesses to a storage device and from file system metadata and for optimizing utilization of the storage device based on the hints.

SUMMARY

Methods, systems, and computer readable media for automatically deriving hints from storage device accesses and from file system metadata and for utilizing the hints to optimize utilization of the memory storage device are provided. One method includes analyzing an input/output operation involving non-volatile memory or file system metadata. The method further includes automatically deriving, based on results from the analyzing, a hint regarding an expected access pattern to the non-volatile memory. The method further includes using the hint to optimize utilization of the non-volatile memory.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

The subject matter described herein includes methods, systems, and computer readable media for automatically deriving hints from accesses to a storage device and from file system metadata and for optimizing utilization of the storage device based on the hints. The operations described herein are performed at the storage device level, for example, using a hardware or firmware hint derivation and memory utilization optimization module that automatically detects patterns in data that is written to a storage device and derives hints from the patterns regarding how data will likely be accessed by a host. The hint derivation and memory utilization optimization module may also utilize frequency of accesses to memory locations and file system metadata to derive hints and to determine how to best optimize utilization of storage device resources.

Figure 1:
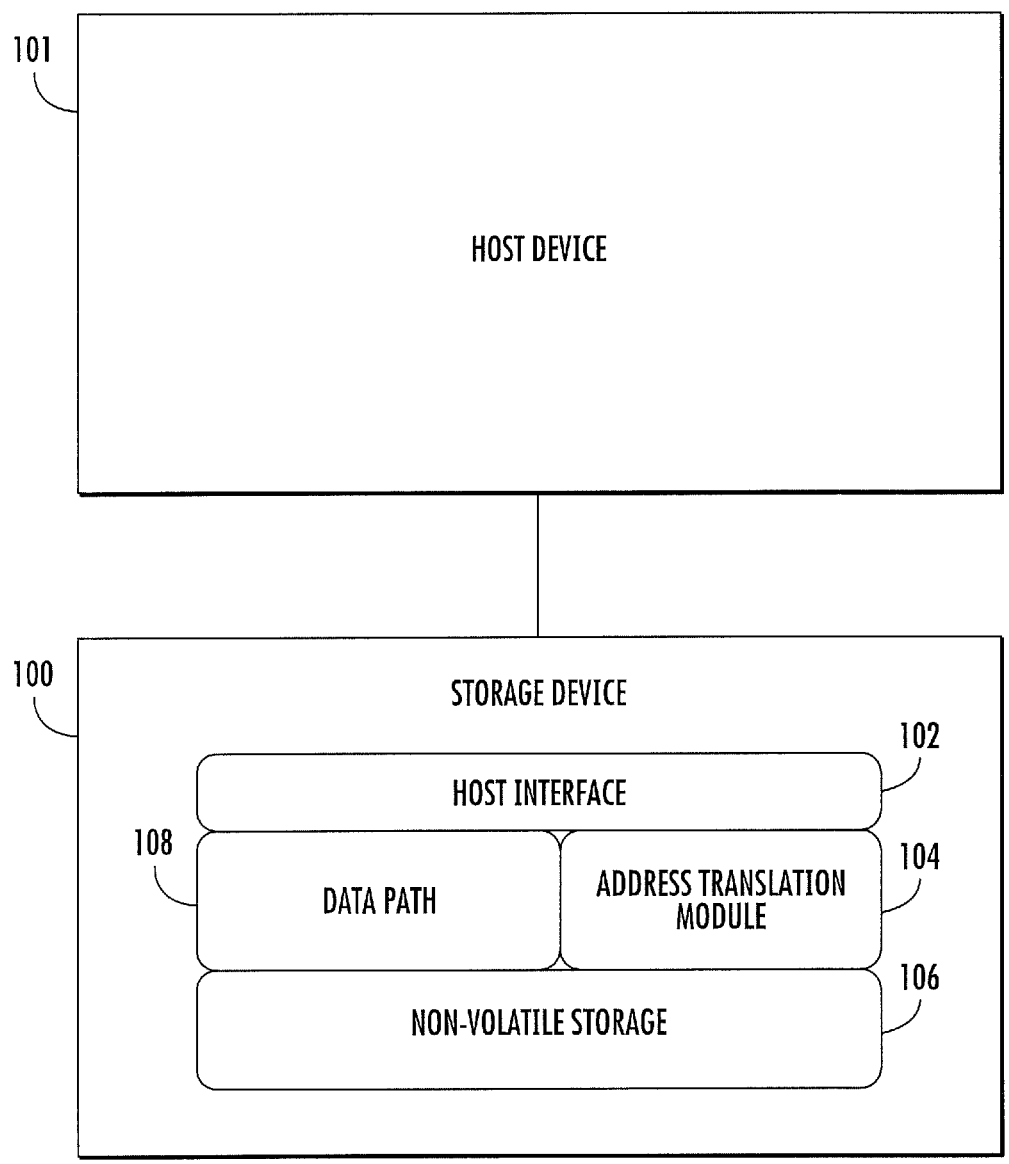
FIG. 1 is a block diagram illustrating an exemplary operating environment for the subject matter described herein.

FIG. 1 is a block diagram of an exemplary operating environment in which the hint derivation and storage device utilization optimization methods described herein may be used. Referring to FIG. 1, a storage device 100 provides non-volatile storage for a host device 101. Storage device 100 may be any suitable device that incorporates non-volatile memory and that allows access to that memory by a host device. In one example, storage device 100 may be a NAND flash device. However, other storage devices may also be used within the scope of the subject matter described herein. For example, storage device 100 may be a NOR flash device, a solid state drive that incorporates NOR and/or NAND flash memory, or a device that combines solid state storage with disk storage.

Storage device 100 may include hardware, software, and firmware components. For example, storage device 100 typically includes a storage controller that controls access by host device 101 to non-volatile memory storage. As described above, storage device 100 may also include hardware or firmware components that implement hint derivation and storage device utilization optimization as described herein. These components will be described in more detail below.

In the illustrated example, storage device 100 includes a host interface 102 for interfacing with host device 101. Host interface 102 may be any suitable interface for handling I/O operations between host device 101 and non-volatile memory. For example, host interface 102 may be a SATA interface, a peripheral component interface express (PCIe) interface, or any other suitable interface for receiving I/O commands from a host system. An address translation module 104 translates from the address space by the host to the address space used by storage device 100 to access non-volatile storage 106. In one example, host device 101 may use logical addressing by specifying logical block addresses (LBAs) in I/O operations to storage device 100, storage device 100 may use physical addressing to specify memory locations, and address translation module 104 may translate between the logical address space and the physical address space Non-volatile storage 106 may comprise the physical memory cells where data is stored. For example, in the case of flash memory, non-volatile storage 106 may include NAND or NOR flash memory cells in two-dimensional, three-dimensional, or combinations of two-dimensional and three-dimensional configurations. As stated above, non-volatile storage 106 may also include one or more disk storage devices. Storage device 100 further includes a data path 108 that communicates data from host device 101 to non-volatile storage 106 and from non-volatile storage 106 to the host. Data path 108 may include data buffers and error detection and correction modules for ensuring data integrity. In addition, as will be described in detail below, data path 108 may also include hint derivation and memory utilization optimization.

Figure 2:
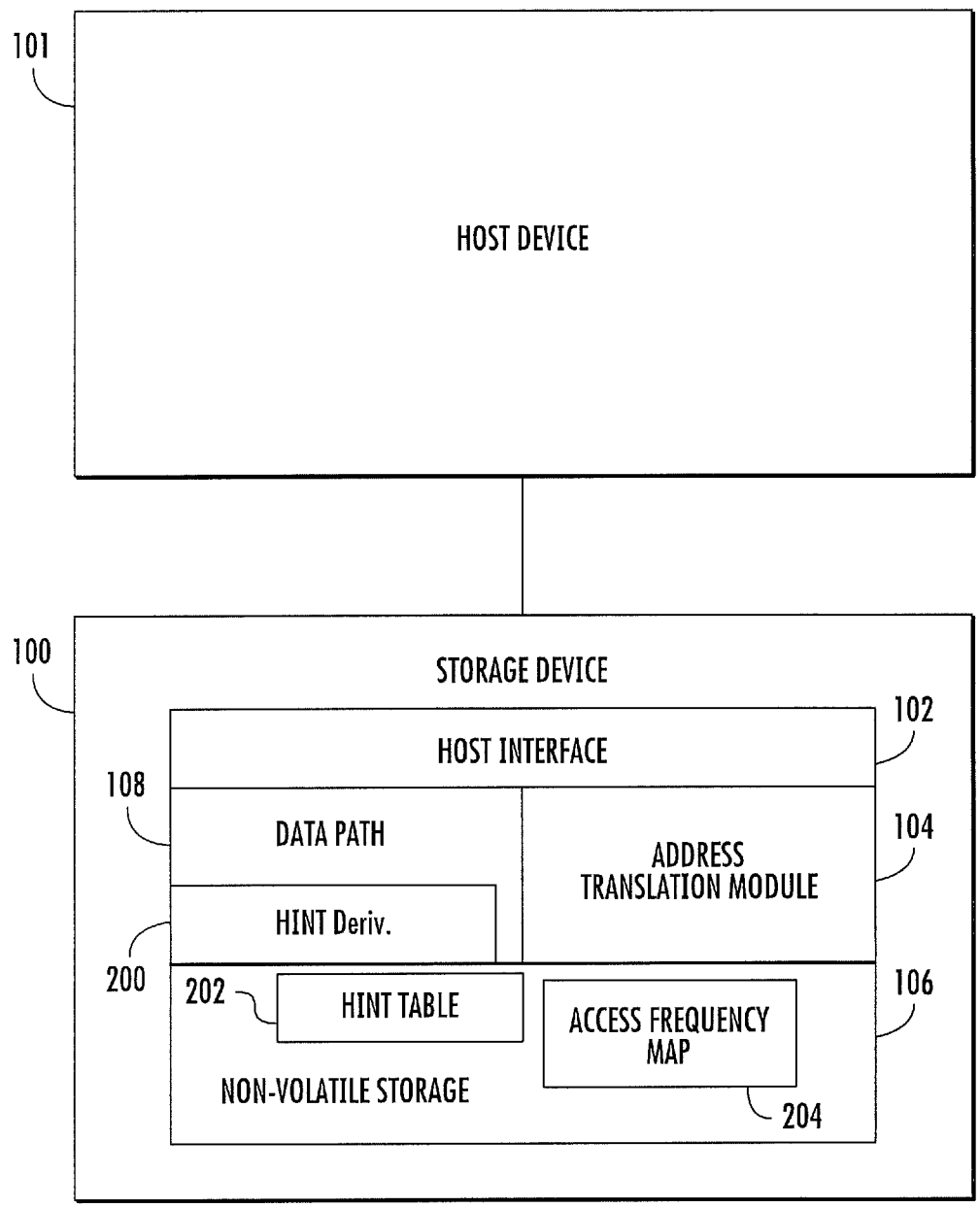
FIG. 2 is a block diagram of exemplary components of a storage device with a hint derivation and memory utilization optimization module, hint tables, and a access frequency map according to an embodiment of the subject matter described herein.

FIG. 2 is a block diagram of storage device 100 and host device 101 in FIG. 1 where storage device 100 includes a hint derivation and memory utilization optimization module 200 for deriving hints from accesses to storage device and from file system metadata and utilizing the hints to optimize utilization of non-volatile storage 106. In FIG. 2, hint derivation and memory utilization optimization module 200 may comprise a hardware or firmware component of storage device 100 that resides on the storage device side of host interface 102 and analyzes incoming data for patterns. Hint derivation and memory utilization optimization module 200 may also detect the access frequency for LBAs in I/O requests from host device 101. Hint derivation and memory utilization optimization module 200 may also derive hints from file system metadata. Hint derivation and memory utilization optimization module 200 may use the hints to optimize utilization of non-volatile memory. Examples of optimizations that may be performed will be described below.

A hint table 202 stores LBA ranges and corresponding hints that indicate how the corresponding LBA range will likely be accessed by the host system in the future. In one example, the hints may be file types, which provide an indication of how the files will subsequently be accessed by the host system. Access frequency map 204 stores LBA ranges and frequencies of access for the ranges. Access frequency map 204 may be in the form of statistics, counters, logs, or any other direct or derived mechanism for recording access frequencies for different LBAs. Hint table 202 and the access frequency map 204 may be stored in any suitable location within storage device 100. For example, hint table 202 and access frequency map 204 may be stored in non-volatile storage 106 or in cache memory that is separate from non-volatile storage 106. In addition, hint table 202 and access frequency map 204 may be combined into a single data structure so that an access frequency is specified for each LBA range entry in hint table 202.

Figure 3:
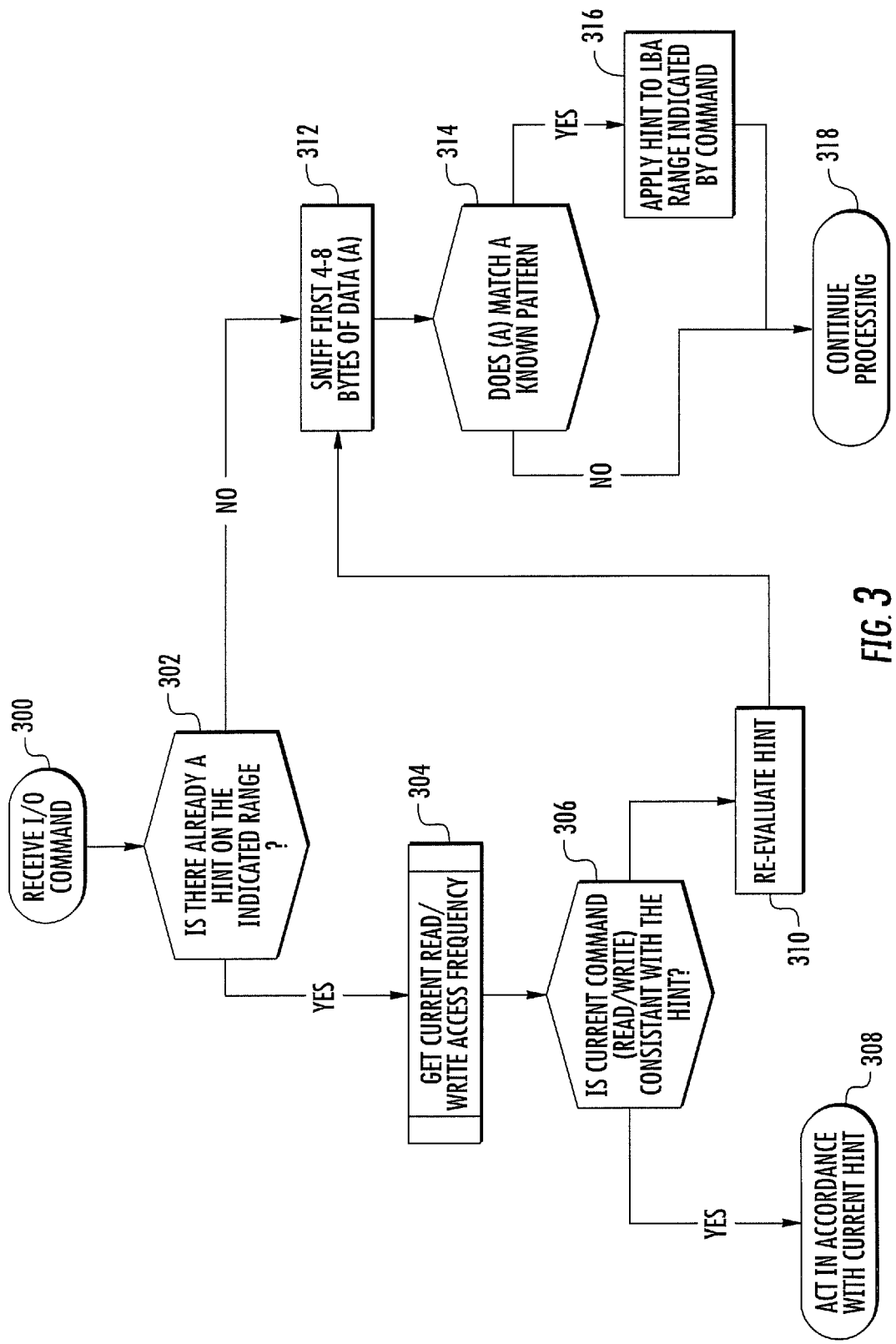
FIG. 3 is a flow chart illustrating an exemplary process for in-line hint derivation and memory utilization optimization according to an embodiment of the subject matter described herein.

FIG. 3 is a flow chart illustrating exemplary steps for in-line hint derivation and corresponding memory utilization optimization according to an embodiment of the subject matter described herein. By "in-line", it is meant that hints associated with the anticipated host memory access pattern are derived by the storage device while performing a host initiated I/O operation. In-line hint derivation and corresponding memory optimization is believed to be beneficial because the anticipated type of memory access for a specific LBA range in an I/O request can be used to determine where to initially store data from the I/O request in the case of a write operation. However, the subject matter described herein is not limited to in-line hint derivation and memory utilization optimization. Hint derivation may be performed asynchronously with respect to I/O operations. Asynchronous hint derivation may not allow optimization of how data is initially stored. However, the data can be subsequently moved to optimize utilization of storage device 100.

Referring to FIG. 3, in step 300, an I/O command is received. The I/O command may be a read command or a write command received by hint derivation and memory utilization optimization module 200. In step 302, it is determined whether or not a hint already exists for the LBA range in the I/O command. In order to determine whether a hint exists for the range specified in the I/O command, hint derivation and memory utilization optimization module 200 may extract the LBA range from the I/O command sequence and perform a lookup in hint table 202 to determine whether an entry for the LBA range is present in hint table 202. Table 1 shown below illustrates exemplary entries that may be present in hint table 202:

TABLE 1

Exemplary Hint Table Entries

| LBA Range | Hint |
| --- | --- |
| 0x00000000-0x3FFFFFFF | JPEG Image File |
| 0x40000000-0x400001F3 | Executable File |
| 0x50000000-0x8FFFFFFF | Swap File |

In Table 1, the left hand column includes LBA ranges corresponding to previous I/O operations by host device 101 for which hints have been derived. The right hand column includes corresponding hints. In the illustrated example, the hints are file types which provide insight as to how the data may be accessed by the host in the future. For example, the first entry in the hint table indicates that the LBA range stores a JPEG image file. A JPEG image file may be a photo that is likely to be written only once and then read sequentially. Such a file is preferably stored in static memory cells that have a relatively lower number of remaining program and erase cycles, as it is unlikely that even for read operations the JPEG image file will be frequently accessed. In addition, the JPEG image file may be distributed across flash memory in a manner that is optimal for sequential read access. It may also be desirable to store the JPEG image file with other JPEG image files that were created around the same time, as accesses to JPEG image files that relate to the same event are likely to occur together.

The second entry in Table 1 is an executable file. Similar to a JPEG image file, an executable file is likely to be written once and then read sequentially when the corresponding program is executed. An executable file may therefore be stored or distributed across memory cells in a manner that is optimal for sequential read access. The executable file may be stored in static or dynamic regions of non-volatile storage 106 depending on the type of program and anticipated frequency of access. For example, if the program is a web browser which is likely to be frequently accessed, the web browser may be stored in a dynamic portion of non-volatile storage 106. If however, the program is a back-up program that runs only once per week, the program may be stored in a static region of non-volatile storage 106.

The third entry in Table 1 includes a hint that indicates that the file is a system swap file. A swap file is typically, frequently accessed because it enables an operating system to use secondary storage devices, such as storage device 100, to simulate extra memory. When the system runs low on memory, it swaps a section of system Random Access Memory (RAM) that an idle program is using onto the storage device to free up memory for other programs. A swap file is preferably stored in a dynamic region of non-volatile storage 106 in light of the frequent access and low latency requirement of a swap file. A dynamic region of non-volatile storage 106 may, in addition to having a large number of remaining program and erase cycles, be a region with relatively low access latency, as compared with other regions of non-volatile storage 106.

Returning to step 302 in FIG. 3, if a hint is present, control proceeds to step 304 where the current read or write access frequency is determined. This step may be performed by hint derivation and memory utilization optimization module 200 accessing access frequency data stored for the LBA range in the I/O operation in access frequency map 204. In step 306, it is determined whether the current command is consistent with the hint. Determining whether the current command is consistent with the hint may include examining the command type and/or the access frequency data to determine whether the hint needs to be reevaluated. For example, if the hint stored for a particular LBA range indicates that the file stored is JPEG image file and the command is a write command, the hint may require reevaluation, as it is unlikely that a JPEG file will be overwritten by the host once it is written the first time. In the same example, if the command for the LBA range is a read command for a previously stored JPEG file, then the command is consistent with the current hint. If the current command is consistent with the hint, control proceeds to step 308, where an action is performed in accordance with the current hint. Performing an action in accordance with the current hint may include carrying out the I/O operation and updating the associated access frequency data. Continuing with the JPEG file example, the read command may be executed. If the current command is not consistent with the hint, control proceeds to step 310 where hint re-evaluation begins.

As part of hint re-evaluation, in step 312, the first four bytes of data in the command are analyzed. In step 314, it is determined whether the data matches a known pattern. Table 2 shown below illustrates different patterns that may be analyzed in a Macintosh (MAC)- or Windows-based file system.

TABLE 2

Windows File System Patterns

| Pattern | Hint |
| --- | --- |
| "FILE" | NTFS MFT entry |
| "PK" | ZIP compressed file (including JAR files, Android APK files, and compressed document files) |
| "RCRD", "RSTR" | NTFS log metadata |
| 0xFE 0xED 0xFA | Mach-O executable |

TABLE 2-continued

Windows File System Patterns

| Pattern | Hint |
|---|---|
| "HIBR" | Hibernate data |
| "MZ" | Windows or UEFI executable |
| 00 00 00 18 66 74 79 70 | MPEG-4 video file |
| 00 00 00 1C 66 74 79 70 | |
| "ID3" | ID3v2-tagged MP3 file |
| "MDMP" | Windows minidump file |
| "PAGEDUMP" | Windows pagedump file |
| 0x89, "PNG" | PNG Image file format |
| 0x42 0x4D | BMP Image file format |
| "GIF" | GIF Image file format |

In the examples in Table 2, the patterns in the left-hand column correspond to file type in the right-hand column. The file types can be used by storage device 100 to determine how that file will be accessed. For example, if the file is an executable file, it is known that executable files are relatively static. That is, they are typically written once to non-volatile storage, not modified, but may be completely erased and replaced. Thus, an executable file may be written to a static or portion of non-volatile storage. In another example, if the data contains the pattern "PK", or is determined to be an image file format, or is determined to be of particular audiovisual file formats, then the file may be determined to be a compressed file. A compressed file is not likely to require recompression and thus may be stored in static portion of non-volatile storage 106.

Continuing with step 314, it is determined whether the first 4 to 8 bytes of data in the data or payload portion of the I/O command sequence matches a known pattern. If the data matches a known pattern, control proceeds to step 316 where a hint is applied to the logical block address range indicated by the I/O command. Applying the hint may include storing the derived hint for the LBA range in the hint table and treating the data in accordance with the identified file type to optimize utilization of the memory storage device. If the hint does not match a known pattern, control proceeds to step 318 where processing is continued. Continuing the processing may include completing the I/O command and updating the access frequency for the LBA range.

Figure 4:
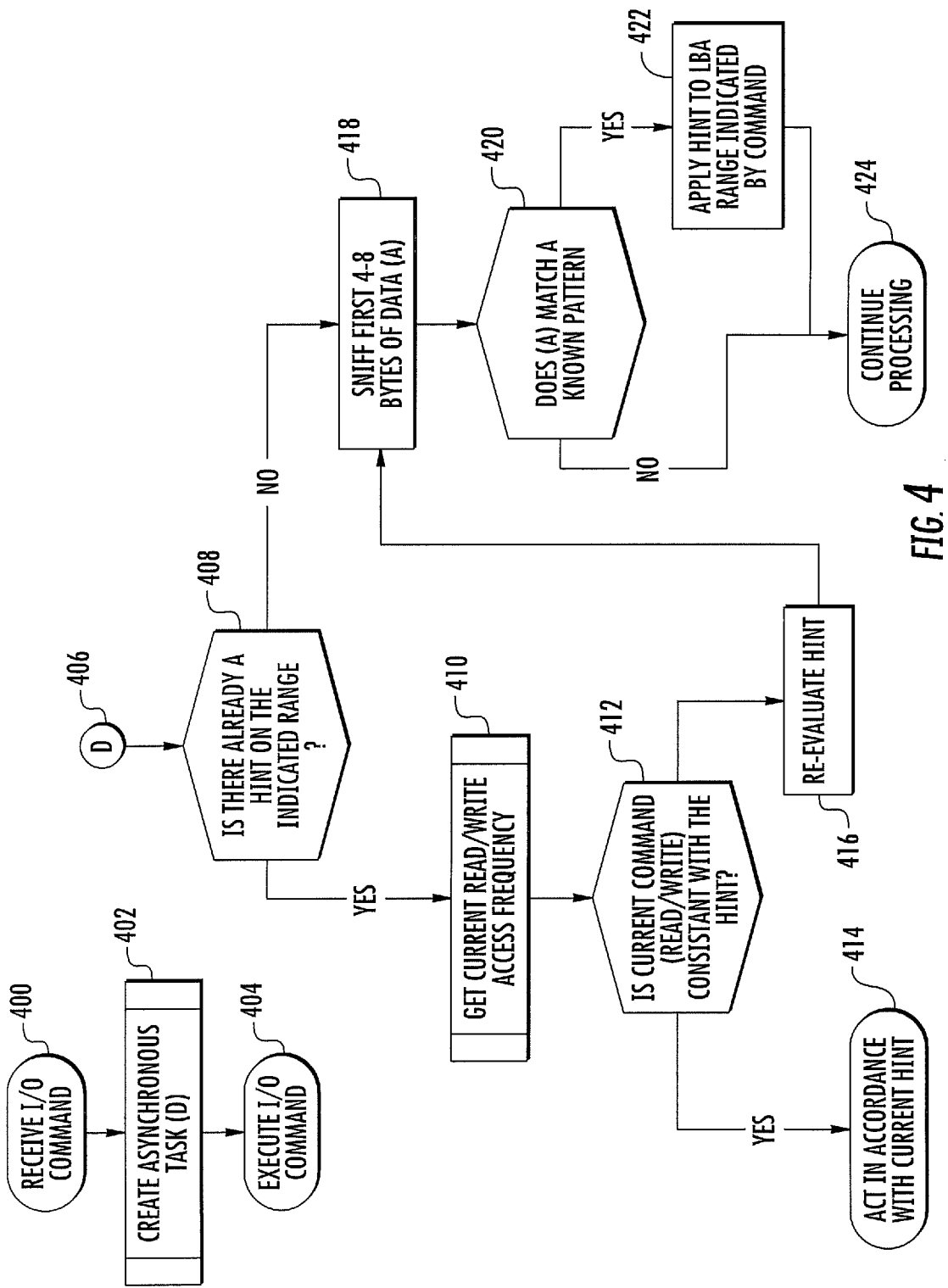
FIG. 4 is a flow chart illustrating an exemplary process for asynchronous hint derivation and memory utilization optimization according to an embodiment of the subject matter described herein.

As stated above, the subject matter described herein is not limited to deriving hints in-line, although such derivation is desirable because it allows any storage device optimizations to be performed when data is initially stored in non-volatile storage 106. The subject matter described herein also includes deriving hints asynchronously, i.e., performing the I/O operations and deriving hints asynchronously from the I/O operations. Deriving hints asynchronously is likewise beneficial to ensure repeated optimization of storage resources. FIG. 4 is a flow chart illustrating asynchronous hint derivation according to an embodiment of the subject matter described herein. Referring to FIG. 4, in step 400, an I/O command is received. The I/O command may be a read command or a write command regarding a specific LBA range. In step 402, an asynchronous task "D" is created to derive the hint for the I/O command. Creating the asynchronous task may include spawning a thread or process that analyzes the data in the I/O command sequence and any previously stored hints. In step 404, the I/O command is executed independently of the process that derives and acts on the hint. Referring to step 406, asynchronous task D begins its execution. The asynchronous task D executes steps 408-424 to derive the hint and apply the hint. Steps 408-424 are the same as steps 304-318 described above with respect to FIG. 3, with the exception that applying the hint (step 414 or 426) occurs independently of the current I/O operation. For example, applying hints may include marking the LBA ranges in the hint table such that when NAND maintenance operations, read look ahead, or other logical operations optimizing the data are utilized, the hint is available and is used as a method of making decisions about the data. For example, if the hint indicates that the data is temporary, it may be skipped in relocation decisions. Alternatively, if the data is expected to be heavily read but not written often, it may be grouped together with other "hot read" data to reduce read scrub copies of data which is relatively static.

As stated above, hint derivation may also occur by parsing file system metadata. File system metadata refers to data that is written by the file system to non-volatile storage to characterize files. File system metadata may be parsed for hint derivation as it is written to storage device 100, during storage device idle time, or opportunistically during maintenance operations that access the physical blocks in which the metadata is stored. File system metadata typically includes the following information about each file (all attributes are present in NTFS, HFS+, and the ext4 file system):

Access times (last access, last modification, creation time)
Filename
Directory structure
Extent map (map of file offsets to LBA ranges)

In some file systems (such as NTFS and HFS+), the extent map may include resident portions in a central file (called the catalog file in HFS+ and the MFT in NTFS), as well as a non-resident extension used for additional extent maps in severely fragmented files. Depending on internal device resources, storage device 100 may elect not to de-reference non-resident extents into hints.

Filename parsing works based on common usage patterns associated with file extensions or directory trees. For example, the Windows operating system uses the "Program Files" and "Program Files (x86)" directories to store executable resources, which are typically static. Furthermore, executables in Windows tend to have an extension of "EXE" or "DLL". Correspondingly, Mac OS X uses directories with the extension ".app" to store executables. (The actual executables in Mac OS X do not have an identifying extension.) Temporary files have a ".tmp" extension or are in a directory called "tmp" or "Temporary Internet Files". Internet browser cache files (which are also short-lived) may have identifying characteristics such as brackets in the filename, enclosing a single digit.

Figure 5:
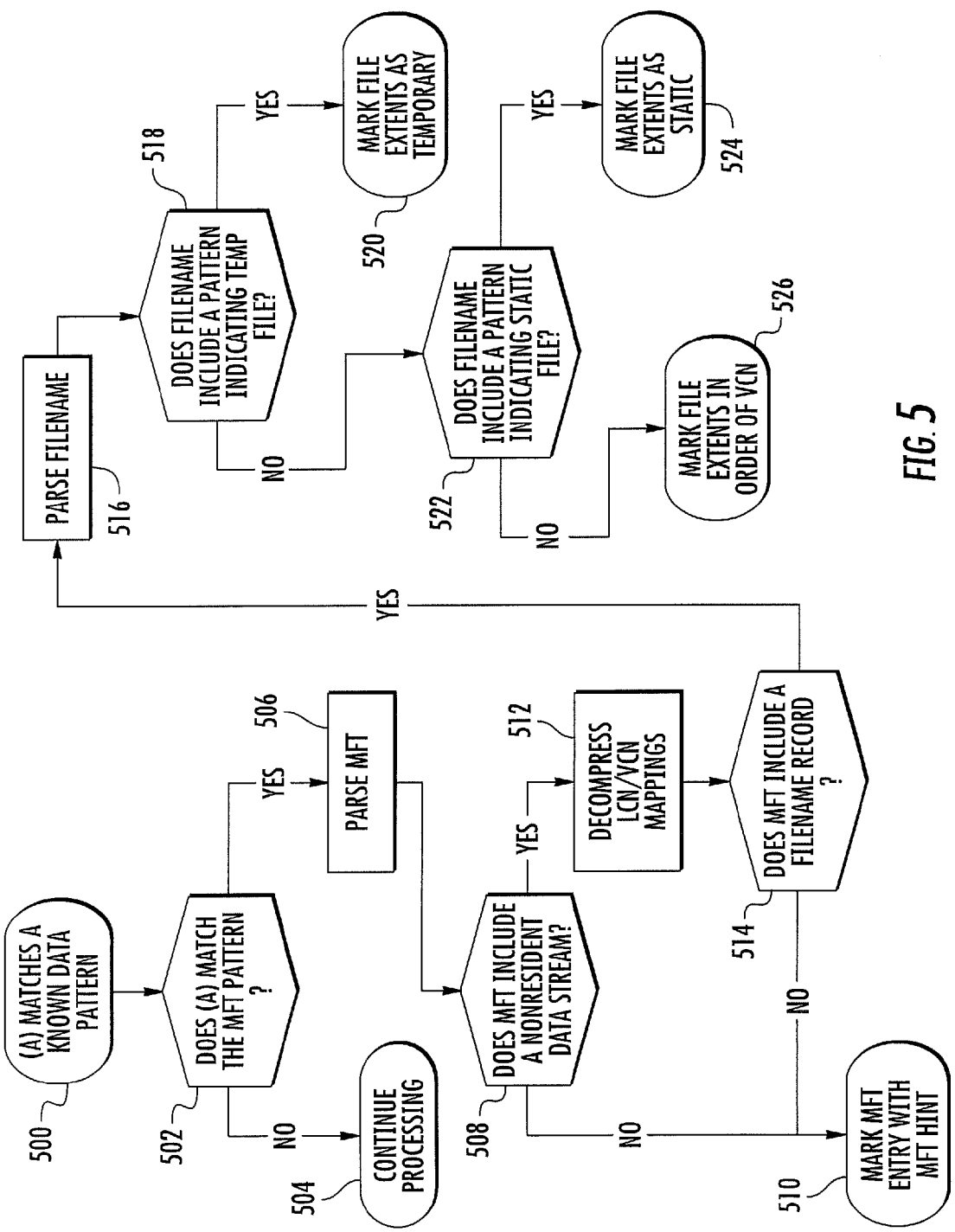
FIG. 5 is a flow chart illustrating an exemplary process for parsing file names in a master file table according to an embodiment of the subject matter described herein.

FIG. 5 illustrates hint derivation by file name parsing according to an embodiment of the subject matter described herein. In step 500, it is determined whether data in an I/O command sequence received by storage device 100 matches a known data pattern. In step 502, it is determined whether the data matches the MFT pattern. As illustrated by the first entry in Table 2, the MFT pattern is the characters "FILE". Thus, if the data parsed from the I/O operation includes the characters "FILE", then the I/O operation may be determined to be a write to the MFT table. If the operation does not match the MFT pattern, control proceeds to step 504 where processing is continued. Continuing the processing may include performing another type of hint derivation, such as based on last written and last read attributes maintained by the file system as will be described in more detail below.

In step 502, if the data matches the MFT pattern, control proceeds to step 506, where the MFT is parsed. Parsing the MFT includes locating the MFT entry corresponding to the I/O operation. Parsing the MFT continues in step 508, where it is determined whether the MFT entry stores a non-resident data stream. A non-resident data stream is a file whose location is specified in the MFT entry, but which is stored external to the MFT. A resident data stream is a file that is stored in the MFT entry. Accordingly, a write to the MFT for a resident file is a write to the file. Thus, if the MFT entry has a resident file, control proceeds to step 510 where the MFT entry is marked with a hint indicating that the entry includes an MFT resident file.

Returning to step 508, if the MFT entry includes a non-resident data stream, i.e., a pointer to one or more locations outside of the MFT that stores the corresponding file, control proceeds to step 512 where the logical cluster number/virtual cluster number (LCN/VCN) mappings that indicate storage locations for a non-resident file are decompressed. In step 514, it is determined whether the MFT entry includes a file name record. If the MFT entry does not include a file name record, control returns to step 510 where the entry is marked with an MFT hint. An MFT hint may explicitly identify the entry as an MFT entry.

If the MFT entry includes a file name record, control proceeds to step 516 where the file name is parsed. File name parsing continues in step 518 where it is determined whether the file name includes a pattern indicating a temp file. File names for temp files vary per operating system. In a Windows-based operating system, a temp file may end with the suffix ".tmp" or may include closed brackets that surround a single number. If the file name pattern indicates a temp file, control proceeds to step 520 where the file extents that store the file are marked as temporary. Marking the extents as temporary may include inserting hints in the MFT table that marks the extents as temporary or adding entries to the hint table that mark the LBA ranges corresponding to the file extents or containing a temp file.

Returning to step 518, if the file name does not include a pattern identifying the file as temporary, control proceeds to step 522 where it is determined whether the file name includes a pattern identifying a static file. As described above, examples of static files are executable files and sometimes image files. If the file name includes a pattern identifying the file as static, control proceeds to step 524 where the extents are marked as static. If the file name does not include a pattern indicating a static file, control proceeds to step 526 where the extents are marked in the order specified by the virtual cluster numbers in the MFT table. The purpose of ordering the extents allows the storage device to know the order of data in the file so that the device can reorder the file for optimal host access. Reordering the file may include storing the extents of the file in different memory blocks so that they can be read out in parallel.

As stated above, another approach to parsing file system metadata is to parse last written and last read attributes in the file system and to combine these attributes with correctable error count rates or with internal counters in order to determine the access frequency of the read and optimize read scrub algorithms. Correctable error rates would correlate with increased read activity in some storage types and may be augmented by device based historical data collected on reads and writes to extents that map to files that are expected to be heavily accessed.

Figure 6:
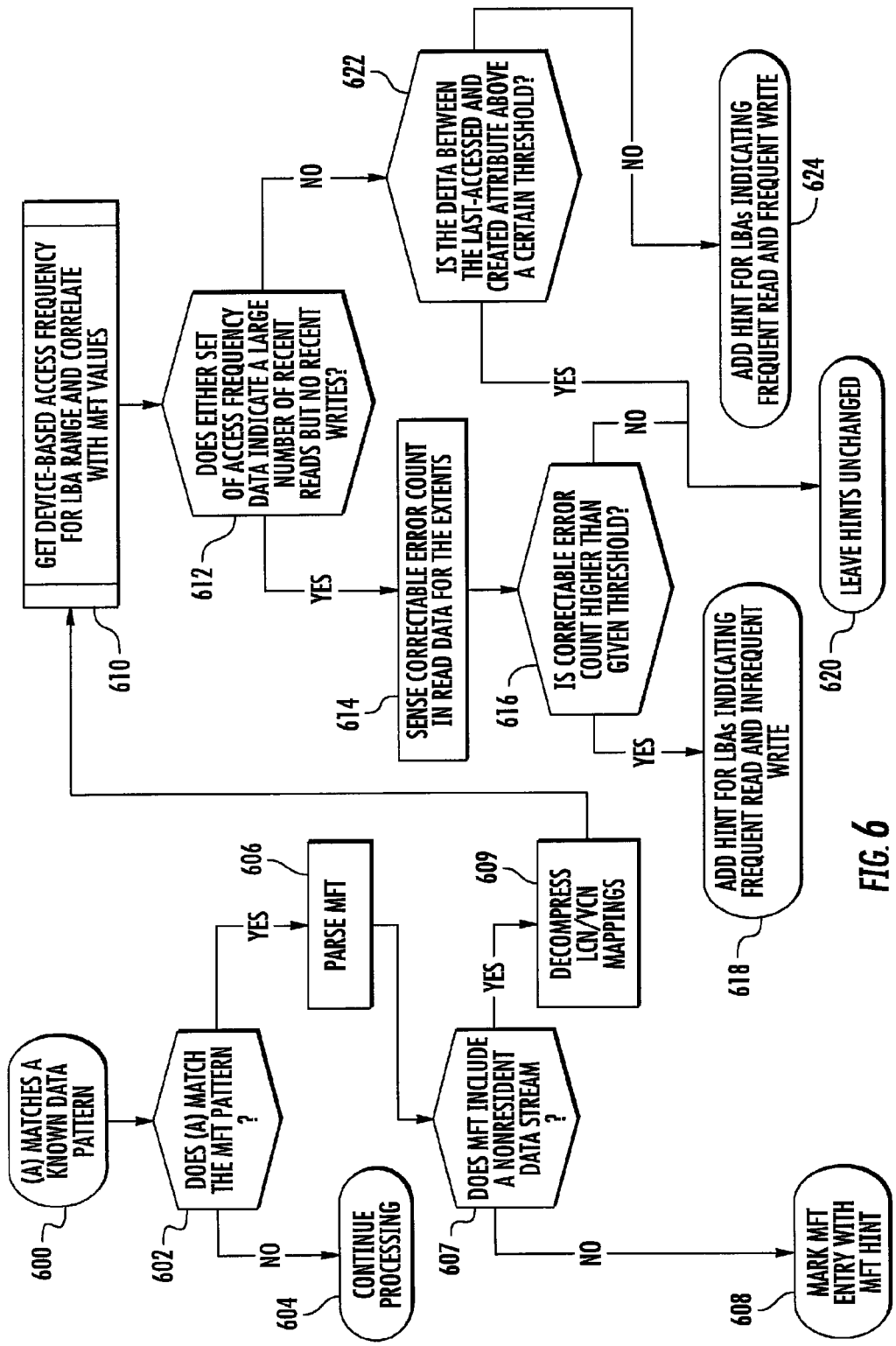
FIG. 6 is a flow chart illustrating an exemplary process for deriving hints from frequently read and frequently accessed attributes in a master file table according to an embodiment of the subject matter described herein.

A frequently read or frequently written hint can be based on combinations of these two inputs, as described below with respect to FIG. 6. Referring to FIG. 6, in step 600 and 602, it is determined whether the file and the data in an I/O request matches the MFT pattern. As described above, the MFT pattern in a Windows file system is the word "FILE". If the file name does not match the MFT pattern, control proceeds to step 604 where additional processing is performed to determine whether the data matches any of the other patterns described above.

If the data in the I/O request matches the MFT pattern, control proceeds to step 606 where the MFT is parsed. Parsing the MFT may include locating the MFT entry corresponding to the I/O operation. In step 607, it is determined whether the MFT entry includes a non-resident data stream. If the MFT entry includes a resident data stream, control proceeds to step 608 where the entry is marked with a hint indicating that the LBA range in the I/O request corresponds to an MFT resident file. If the MFT entry includes a non-resident data stream, control proceeds to step 609 where the LCN/VCN mappings are decompressed to determine the locations of the extents that store the non-resident file. Once the LCN/VCN mappings are determined, control proceeds to step 610 where the device based access frequency for the LBA range is obtained from the access frequency map and that access frequency is correlated with the MFT attributes that correspond to file access frequency. In step 612, it is determined whether either set of access frequency data indicates the large number of reads but no recent writes. If the access frequency data indicates a large number of reads but no recent writes, control proceeds to step 614 where a correctable error count is sensed in read data for the extents. In step 616, it is determined whether the correctable error count is higher than a given threshold. If the correctable error count is higher than a given threshold, control proceeds to step 618 where a hint is created for the LBAs indicating frequently read and infrequently written. If the correctable error count is not higher than a given threshold, control proceeds to step 620 where the hints associated with the LBA range are left unchanged.

Returning to step 612, if it is determined that either set of access frequency data does not indicate a large number of reads but no recent writes, control proceeds to step 622 where it is determined whether the difference between the last accessed and created attribute is above a threshold. If the last accessed and created attribute is above the threshold, this means that the file is static, and control proceeds to step 618 where the hints are left unchanged. If the difference between last accessed and created attribute is not above the threshold, this means that the file is frequently read and written, so control proceeds to step 624 where a hint is added to the logical block addresses indicating frequently read and frequently written data. As described above, hints that indicate frequently read and frequently written data can be used to place the data in a region of the storage device that contains memory cells with a larger comparative number of remaining program and erase cycles.

Although in the examples illustrated in FIGS. 5 and 6 file system metadata is parsed in the context of an I/O request, the subject matter described herein is not limited to deriving hints from file system metadata in the context of an I/O request. File system metadata constitutes data that is stored in non-volatile memory. Accordingly, such metadata can be parsed independently of I/O operations to derive hints associated with LBA ranges corresponding to files referenced in file system metadata.

In addition, the subject matter described herein is not limited to parsing timestamps and filenames to derive hints. Another type of file system metadata that may be used for hint derivation are file attributes (read only, hidden, system, compressed) that can also be extracted to help with hinting. For example, if a file is marked read only, then it is not likely that the file will be modified and the file can be stored in a static portion of non-volatile memory 106. Similarly, if a file is marked as hidden or system, this typically refers to the file is being a part of the operating system. A file that is part of the operating system is one that is not likely to be modified, so it could also be stored in a static portion of non-volatile memory 106. The file attributes can be combined with any of the attributes or other sources described herein for enhanced hint derivation.

The subject matter described herein can be implemented in any suitable NAND flash memory, including 2D or 3D NAND flash memory. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element; such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the subject matter described herein is not limited to the two dimensional and three dimensional exemplary structures described but cover all relevant memory structures within the spirit and scope of the subject matter as described herein and as understood by one of skill in the art.

It will be understood that various details of the subject matter described herein may be changed without departing from the scope of the subject matter described herein. Furthermore, the foregoing description is for the purpose of illustration only, and not for the purpose of limitation.

What is claimed is:

1. A storage device comprising:
   non-volatile memory; and
   a hint derivation module configured to analyze at least one of:
      input/output (I/O) command sequences for I/O operations involving the non-volatile memory; and
      file system metadata comprising a master file table (MFT);
   the hint derivation module configured to automatically derive hints regarding expected access patterns to the non-volatile memory based on the analyzing and to use the hints to optimize utilization of the non-volatile memory, wherein the hint derivation module is further configured to:
      detect an I/O operation pertaining to the MFT;
      locate an entry in the MFT corresponding to the detected I/O operation, the entry corresponding to a particular file;
      parse the entry of the MFT to determine whether the entry comprises resident file data, the resident file data comprising file data of the particular file stored within the MFT;
      record a first hint in response to determining that the entry comprises resident file data stored within the MFT, the first hint including an indication that file data of the particular file are stored within the entry of the MFT; and
      record a second hint that does not include the indication in response to determining that the entry does not comprise resident file data-stored within the MFT, the second hint indicating that file data of the particular file are stored outside of the MFT.

2. The memory device of claim 1, wherein the hint derivation module determines that the entry comprises resident file data stored within the MFT in response to determining that the entry comprises a resident data stream.

3. The memory device of claim 1, wherein the non-volatile memory comprises flash memory having one or more of a two-dimensional configuration and a three-dimensional configuration, the flash memory comprising one or more of NAND flash memory and NOR flash memory.

4. The memory device of claim 1, wherein the non-volatile memory comprises a solid state memory and at least one disk storage device.

5. The memory device of claim 1, wherein the hint derivation module is configured to automatically derive hints from the I/O operations involving the non-volatile memory.

6. The memory device of claim 5, wherein the hint derivation module is configured to parse payload portions of the I/O command sequences to identify patterns that are indicative of respective hints.

7. The memory device of claim 6, wherein the hint derivation module is configured to identify a matching file name pattern and a corresponding file type associated with the file name pattern in response to parsing a payload portion of an I/O command sequence.

8. The memory device of claim 7, wherein the hint derivation module is configured to mark logical block addresses associated with the I/O command sequence with a hint that corresponds to the identified file type.

9. The memory device of claim 5, wherein the hint derivation module is configured to determine an access frequency associated with an address range specified in one or more of the I/O operations and to determine whether the determined access frequency is consistent with a current hint stored for the address range.

10. The memory device of claim 5, wherein the hint derivation module is configured to derive the hints in-line with the I/O operations.

11. The memory device of claim 5, wherein the hint derivation module is configured to derive hints asynchronously with respect to the I/O operations.

12. The memory device of claim 1, wherein the hint derivation module is configured to automatically derive hints from the file system metadata in response to one or more of: the file system metadata being stored in the non-volatile memory, file system metadata being written to the non-volatile memory, and file system metadata being read from the non-volatile memory.

13. The memory device of claim 12, wherein the hint derivation module is configured to derive hints by parsing the file system metadata.

14. The memory device of claim 12, wherein the hint derivation module is configured to parse at least one of file timestamp attributes, file access frequency attributes, file name attributes, and file extent maps.

15. A method, comprising:
   analyzing one or more of:
      input/output (I/O) command sequences for I/O operations involving a non-volatile memory; and
      file system metadata comprising a master file table (MFT);
   automatically deriving hints regarding expected access patterns to the non-volatile memory based on the analyzing, wherein automatically deriving the hints includes identifying an I/O command sequence for an I/O operation that pertains to the MFT and, wherein, in response to the identifying, the method further comprises:
      parsing the MFT to locate an entry in the MFT corresponding to the I/O operation;
      analyzing the entry of the MFT to determine whether the entry comprises one of: a resident entry configured to store file data of a file within the MFT and a non-resident entry configured to reference file data stored outside of the MFT; and
      in response to determining that the entry comprises a resident entry, marking the entry of the MFT with a first hint, the first hint comprising an indicator designating the entry as a resident entry configured to store the file data of the file within the MFT, in response to determining that the entry comprises a non-resident entry, marking the entry of the MFT with a second hint that does not comprise the indicator, the second hint indicating that the entry is configured to reference file data stored outside of the MFT; and using the hints to optimize utilization of the non-volatile memory.

16. The method of claim 15, wherein determining whether the entry of the MFT is configured to store file data within the MFT comprises determining whether the entry comprises a resident data stream.

17. The method of claim 15 wherein the non-volatile memory comprises flash memory having one or more of a two-dimensional configuration and a three-dimensional configuration, the flash memory comprising one or more of NAND flash memory and NOR flash memory.

18. The method of claim 15, wherein the non-volatile memory comprises solid state memory and at least one disk storage device.

19. The method of claim 15, further comprising receiving the I/O command sequences at a storage device.

20. The method of claim 15, wherein identifying the I/O command sequence comprises matching a payload portion of the I/O command sequence to a pattern.

21. The method of claim 15, wherein automatically deriving the hints comprises parsing the I/O command sequences to determine file types for the I/O command sequences based on file name patterns identified within data of the I/O command sequences.

22. The method of claim 21, wherein using the hints comprises marking logical block addresses corresponding to the I/O operations of the I/O command sequences with the file types determined for the I/O command sequences.

23. The method of claim 15, further comprising:

storing the hints on the non-volatile memory, each stored hint associated with a respective address range;

determining access frequencies associated with address ranges in response to analyzing the I/O command sequences; and determining whether an access frequency determined for a particular address range is consistent with a stored hint associated with the particular address range.

24. The method of claim 15, wherein automatically deriving the hints comprises automatically deriving a hint in-line with an I/O operation of an I/O command sequence.

25. The method of claim 15, wherein automatically deriving the hints comprises automatically deriving a hint asynchronously with respect to an I/O operation of an I/O command sequence.

26. The method of claim 15, wherein automatically deriving the hints comprises analyzing the file system metadata in response to one or more of: file system metadata being stored in the non-volatile memory, file system metadata being written to the non-volatile memory, and file system metadata being read from the non-volatile memory.

27. The method of claim 26, wherein automatically deriving the hints comprises parsing the file system metadata to determine file attributes corresponding to respective address ranges.

28. The method of claim 26, wherein automatically deriving the hints comprises parsing the file system metadata to determine one or more of file name attributes, file timestamp attributes, file access frequency attributes, and file extent maps in the file system metadata.

29. A non-transitory computer readable medium having stored thereon executable instructions that, when executed by a processor, control the processor to perform operations in a non-volatile storage device including non-volatile memory, the operations comprising:

automatically deriving hints regarding expected access patterns to the non-volatile memory by parsing input/output operations and file system metadata, the file system metadata comprising a master file table (MFT); and utilizing the hints to optimize utilization of the non-volatile memory, wherein automatically deriving the hints further comprises:

parsing an input/output operation that matches an MFT pattern;

identifying an entry in the MFT that corresponds to the parsed input/output operation;

determining whether a file associated with the entry comprises one of a resident file and a non-resident file, comprising determining that the file comprises a resident file in response to the entry comprising file data of the file stored within the MFT, and determining that the file comprises a non-resident file in response to the entry referencing file data stored external to the MFT;

marking the entry with a first hint indicating that the file associated with the entry comprises a resident file and that the file data of the file are stored within the MFT in response to determining that the file comprises a resident file; and marking the entry with a second hint indicating that the file comprises a non-resident file and that the entry references file data stored external to the MFT in response to determining that the file comprises a non-resident file.

* * * * *